(12) United States Patent
Kim et al.

(10) Patent No.: US 9,268,813 B2
(45) Date of Patent: Feb. 23, 2016

(54) TERMINAL DEVICE BASED ON CONTENT NAME, AND METHOD FOR ROUTING BASED ON CONTENT NAME

(71) Applicant: Samsung Electronics Co., Ltd., Suwon-si (KR)

(72) Inventors: Jae Hoon Kim, Yongin-si (KR); Ji Hoon Lee, Anyang-si (KR); Joong Hong Park, Seoul (KR); Myeong Wuk Jang, Seoul (KR); Sung Chan Choi, Uijeongbu-si (KR); Dojun Byun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 13/912,570

(22) Filed: Jun. 7, 2013

(65) Prior Publication Data

US 2013/0275464 A1 Oct. 17, 2013

Related U.S. Application Data

(63) Continuation-in-part of application No. 12/946,037, filed on Nov. 15, 2010.

(30) Foreign Application Priority Data

Dec. 24, 2009 (KR) .................. 10-2009-0131093
Aug. 24, 2010 (KR) .................. 10-2010-0082030

(51) Int. Cl.
*H04L 17/00* (2006.01)
*G06F 17/30* (2006.01)
*H04L 29/08* (2006.01)
*H04L 12/725* (2013.01)
(Continued)

(52) U.S. Cl.
CPC ........ *G06F 17/30424* (2013.01); *H04L 45/306* (2013.01); *H04L 49/355* (2013.01); *H04L 67/06* (2013.01); *H04L 67/327* (2013.01); *H04L 45/54* (2013.01)

(58) Field of Classification Search
CPC .......... G06F 11/3433; G06F 17/30424; H04L 45/306; H04L 67/327; H04L 67/06; H04L 49/355; H04L 45/54
See application file for complete search history.

(56) References Cited

U.S. PATENT DOCUMENTS 4,914,571 A * 4/1990 Baratz ............... H04L 29/00
6,363,434 B1 3/2002 Eytchison
(Continued)

FOREIGN PATENT DOCUMENTS

JP 2001-358699 12/2001
JP 2006-094551 4/2006
(Continued)

OTHER PUBLICATIONS

Obermeier, Sebastian; XML Fragment Caching for Large-Scale Mobile Commerce Applications; 2009; ICEC.*
(Continued)

*Primary Examiner* — Polina Peach
(74) *Attorney, Agent, or Firm* — NSIP Law

(57) ABSTRACT

In a network system based on a content name, a terminal device may generate and transmit a block query requesting a plurality of segments, and may receive segments corresponding to the block query based on a transmission direction of the block query.

26 Claims, 9 Drawing Sheets

CONTENT CACHE

| NAME | DATA | LIFETIME |
|------|------|----------|
|      |      |          |
|      |      |          |
|      |      |          |

CONTENT ROUTING TABLE

| NAME | OUTPUT PORT | FLAG | NUM. | INPUT PORT | STATE | LIFETIME |
|------|-------------|------|------|------------|-------|----------|
|      |             |      |      |            |       |          |
|      |             |      |      |            |       |          |
| /abc.com/branch 1/Comm_Lab/N WG/xyz(3:7).avi | 0 | 1 | 3 | - | TENTATIVE | 4 |
| | 0 | | 4 | - | ACTIVE | 4 |
| | 0 | | 5 | - | TENTATIVE | 4 |
| | 0 | | 6 | - | TENTATIVE | 4 |
| | 0 | | 7 | - | TENTATIVE | 4 |

PORT 0 ← QUERY

PORT 1

(51) Int. Cl.
*H04L 12/931* (2013.01)
*H04L 12/741* (2013.01)

(56) References Cited

U.S. PATENT DOCUMENTS

| | | | | |
|---|---|---|---|---|
| 6,430,618 | B1 * | 8/2002 | Karger | G06F 9/5027 709/225 |
| 6,850,980 | B1 | 2/2005 | Gourlay | |
| 6,907,501 | B2 * | 6/2005 | Tariq | H04L 65/4084 455/439 |
| 7,289,498 | B2 * | 10/2007 | Yu | H04L 45/7453 370/389 |
| 7,505,429 | B2 * | 3/2009 | Seol | 370/329 |
| 7,627,570 | B2 * | 12/2009 | Bosloy et al. | |
| 7,925,777 | B2 * | 4/2011 | Levett | H04L 29/06 709/217 |
| 2002/0023080 | A1 * | 2/2002 | Uga | H04L 45/00 |
| 2002/0095400 | A1 * | 7/2002 | Johnson et al. | 707/1 |
| 2002/0099854 | A1 * | 7/2002 | Jorgensen | H04L 1/20 709/249 |
| 2003/0099237 | A1 * | 5/2003 | Mitra | H04L 45/00 370/393 |
| 2003/0145038 | A1 * | 7/2003 | Bin Tariq et al. | 709/202 |
| 2005/0152286 | A1 * | 7/2005 | Betts | H04L 45/02 370/255 |
| 2006/0177094 | A1 | 8/2006 | Smith | |
| 2006/0184632 | A1 * | 8/2006 | Marino et al. | 709/206 |
| 2007/0005801 | A1 * | 1/2007 | Kumar | H04L 63/08 709/238 |
| 2007/0160052 | A1 * | 7/2007 | Okada | H04L 45/742 370/392 |
| 2008/0052784 | A1 * | 2/2008 | Wiley | H04L 41/0896 726/28 |
| 2008/0123662 | A1 * | 5/2008 | Basso et al. | 370/395.31 |
| 2009/0288163 | A1 * | 11/2009 | Jacobson | G06F 15/173 726/22 |

FOREIGN PATENT DOCUMENTS

| | | |
|---|---|---|
| KR | 10-2004-0053145 | 6/2004 |
| KR | 10-2005-0012776 | 2/2005 |
| KR | 10-2005-0059065 | 6/2005 |
| KR | 10-2005-0065387 | 6/2005 |
| KR | 10-2008-0035416 | 4/2008 |
| KR | 10-2008-0082004 | 9/2008 |
| KR | 10-2009-0041440 | 4/2009 |

OTHER PUBLICATIONS

Extended European Search Report (including European Search Opinion) issued May 4, 2011, in counterpart European Patent Application No. 10192619 (8 pages).
Cheriton, Mgritter, "Triad: A New Next-Generation Internet Architecture", 2000, pp. 1-20, Stanford University, Computer Science Department.
Hwang, Haesung, et al., "A Feasibility Evaluation on Name-Based Routing," IP Operations and Management, Lecture Notes in Computer Science, 2009, pp. 130-142, vol. 5843 (Publisher: Springer Berlin / Heidelberg).
Obermeier, Sebastian, et al., "XML Fragment Caching for Large-Scale Mobile Commerce Applications", Proceedings of the 10th International Conference on Electronics Commerce, Innsbruck, Austria, Aug. 19-22, 2008 (7 pages), vol. 342 (Publisher: ACM).
Obermeier, Sebastian; XML Fragment Caching for Large-Scale Mobil Commerce Applications;2009;1CEC.

* cited by examiner

TERMINAL DEVICE BASED ON CONTENT NAME, AND METHOD FOR ROUTING BASED ON CONTENT NAME

CROSS-REFERENCE TO RELATED APPLICATION(S)

The present invention is a continuation-in-part of U.S. patent application Ser. No. 12/946,037 filed on Nov. 15, 2010, and claims the benefit under 35 U.S.C. §119(a) of Korean Patent Application No. 10-2009-0131093, filed on Dec. 24, 2009, and Korean Patent Application No. 10-2010-0082030, filed on Aug. 24, 2010, in the Korean Intellectual Property Office, the entire disclosures of which are each incorporated herein by reference for all purposes.

BACKGROUND

1. Field

The following description relates to technology for routing data in a content-based network, and more particularly, to a terminal device, system, and routing method that may route requested data between network apparatuses based on content name.

2. Description of Related Art

The Internet may be used to provide a one-to-one communication based on a host-to-host connection. However, in an actual Internet environment, networking may be performed based on data or contents, instead of the network hosts. For example, users may have more interest in data rather than an apparatus that stores the data.

During the reception of desired data using a network apparatus, a redundant procedure may occur because of non-matching between an Internet structure and an actual utilization pattern. This redundant procedure may deteriorate the throughput of a network.

Accordingly, there is a desire for routing technology that may match an Internet structure with an actual utilization pattern and also enhance the throughput of a network.

SUMMARY

In one general aspect, there is provided a terminal device based on content name, the terminal device comprising a query generator configured to generate, with respect to content comprising a plurality of segments, a block query comprising a content name and a block range of segments of the content, a table search unit configured to search a routing table for the content name corresponding to the generated block query, a field setting unit configured to set a flag corresponding to a found content name, and to set a block range of segment numbers corresponding to the generated block query in a number field, and a query transmitter configured to transmit the block query using a transmission direction corresponding to the found content name, wherein the block range of segments corresponding to the block query have the same transmission direction.

The field setting unit may be further configured to set a state field of each of the block range of segments corresponding to the block query.

When at least one of the block range of segments corresponding to the block query is received within a predetermined lifetime, the query generator may be further configured to adjust the block range, and to generate the block query comprising the adjusted block range and the content name.

The terminal may further comprise a content receiver configured to receive the block range of segments corresponding to the block query using the same direction as the transmission direction of the block query.

The content receiver may be further configured to receive the block range of segments corresponding to the block query and one or more of the block range of segments have different routing paths.

In another aspect, there is provided a method for routing based on content name, the method comprising generating, with respect to content comprising a plurality of segments, a block query comprising a content name and a block range of segments of the content, searching a routing table for the content name corresponding to the generated block query, setting a flag corresponding to a found content name, and setting a block range of segment numbers corresponding to the generated block query in a number field, and transmitting the block query using a transmission direction corresponding to the found content name, wherein the block range of segments corresponding to the block query have the same transmission direction.

The method may further comprise setting a state field of each of the block range of segments corresponding to the block query.

The generating may comprise adjusting the block range when at least one of the block range of segments corresponding to the block query is received within a predetermined lifetime, and generating the block query comprising the adjusted block range and the content name.

The method may further comprise receiving the block range of segments corresponding to the block query using the same direction as the transmission direction of the block query.

One or more of the received block range of segments corresponding to the block query may have different routing paths.

In another aspect, there is provided a terminal device based on content name, the terminal device comprising a query receiver configured to receive a block query that requests content, wherein the content comprises a plurality of segments and the block query requests at least two segments of the plurality of segments, a table search unit to search a routing table for a content name corresponding to the requested content, and a field setting unit to set a flag corresponding to a found content name, wherein the at least two segments corresponding to the block query have the same transmission direction.

The terminal device may further comprise a query transmitter configured to transmit the block query using a transmission direction corresponding to the found content name, based on whether the requested content is stored.

The field setting unit may be further configured to set a state field of the requested content in the routing table, and to set a reception direction of the block query with respect to the at least two segments corresponding to the block query.

The terminal device may further comprise a content transmitter to transmit each of the at least two segments corresponding to the block query using the set reception direction.

The terminal device may further comprise a content receiver to receive at least one segment of the at least two segments corresponding to the block query using a transmission direction of the block query when the requested content is not stored.

In another aspect, there is provided a method for routing based on content name, the method comprising receiving a block query requesting content, wherein the content comprises a plurality of segments and the block query requests at least two segments of the plurality of segments, searching a routing table for a content name corresponding to the requested content, and setting a flag corresponding to a found content name, wherein the at least two segments corresponding to the block query have the same transmission direction.

The method may further comprise transmitting the block query using a transmission direction corresponding to the found content name, based on whether the requested content is stored.

The method may further comprise setting a state field of the requested content in the routing table, and setting a reception direction of the block query with respect to the at least two segments corresponding to the block query.

The method may further comprise transmitting each of the at least two segments corresponding to the block query using the set reception direction.

The method may further comprise receiving at least one segment of the at least two segments corresponding to the block query using a transmission direction of the block query when the requested content is not stored.

In another aspect, there is provided a network apparatus using a routing table, the network apparatus comprising a content name field used to search for content comprising a plurality of segments, a transmission direction field used to transmit a query for requesting the content, a reception direction field to indicate a reception direction of the query, a flag field to indicate whether the query corresponds to a block query requesting at least two segments of the plurality of segments, and a number field to indicate a number of a segment corresponding to the requested query.

The network apparatus may further comprise a state field to indicate whether the content corresponding to the transmitted query has been received, and a time field to indicate a reception lifetime of the content.

The query may be transmitted using a transmission direction set in the transmission direction field, and the content corresponding to the query may be received using a transmission direction of the query, and the reception direction field may comprise the reception direction of the query, and the content corresponding to the query may be transmitted using the reception direction of the query.

The block query may comprise a content name and a block range, and the block range may comprise a start segment and a last segment of the at least two segments corresponding to the block query.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

Figure 1:
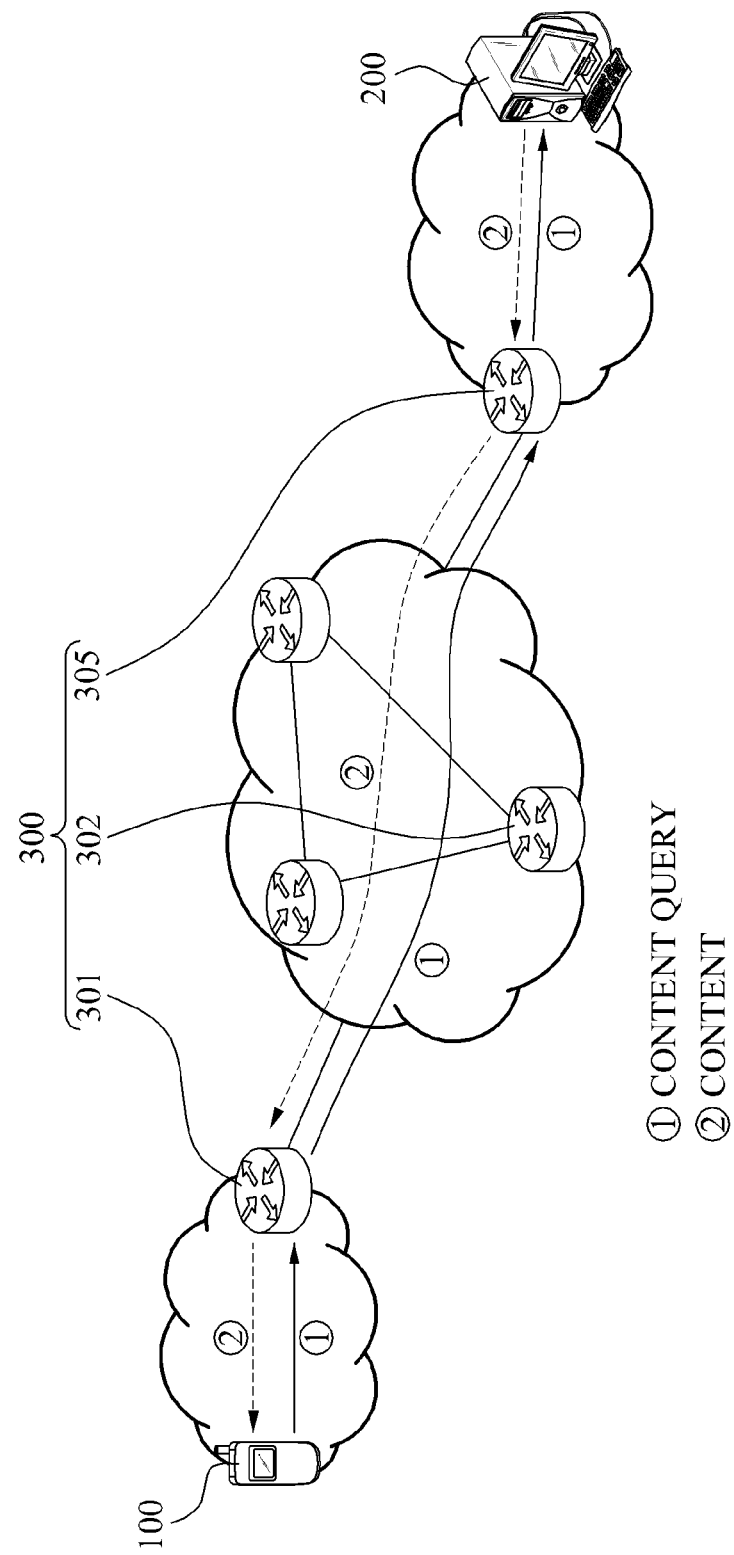
FIG. 1 is a diagram illustrating an example of a network based on content name.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a network based on content name.

Referring to FIG. 1, the network includes a transmitting terminal device 100 requesting content, a receiving terminal device 200 sharing content with the transmitting terminal device 100, and at least one network apparatus 300. In this example, each network apparatus 300 may route the content between the transmitting terminal device 100 and the receiving terminal device 200. While this example includes one transmitting terminal device 100 and one receiving terminal device 200, the present description is not limited thereto, and it should be appreciated that more terminal devices may be included in the network. It should also be appreciated that the transmitting terminal device may also be a receiving device, and vice versa.

As an example, the transmitting and/or receiving terminal device may be a mobile phone, a desktop, a personal computer (PC), a notebook computer, a personal digital assistant (PDA), a digital multimedia broadcasting (DMB) phone, a proxy node, and the like. As an example, the network device 300 may be a switch, a router, and the like. As another example, the network device 300 may be a transmitting and/or receiving terminal such as transmitting terminal device 100 or receiving terminal device 200.

The transmitting terminal device 100 may transmit a content query for requesting content. For example, the content query may be transmitted to the receiving terminal device 200 via the at least one network apparatus 300.

The receiving terminal device 200 may analyze the content query and transmit, to the transmitting terminal device 100, the content requested by the transmitting terminal device 100. For example, the content may be transferred to the transmitting terminal device 100 in a reverse order with respect to a routed path of the content query.

For example, when the content query is transferred in an order of a first router 301, a second router 302, and a fifth router 305, and is received by the receiving terminal device 200, the content transmitted from the receiving terminal device 200 may be transmitted to the transmitting terminal device 100 using routers in the reverse order of the fifth router 305, the second router 302, and the first router 301.

In this example, each router transferring content may transfer the content to a corresponding router or the transmitting terminal device 100 via a port, based on a routing table. A process of transferring the content using the routing table is further described herein.

Figure 2:
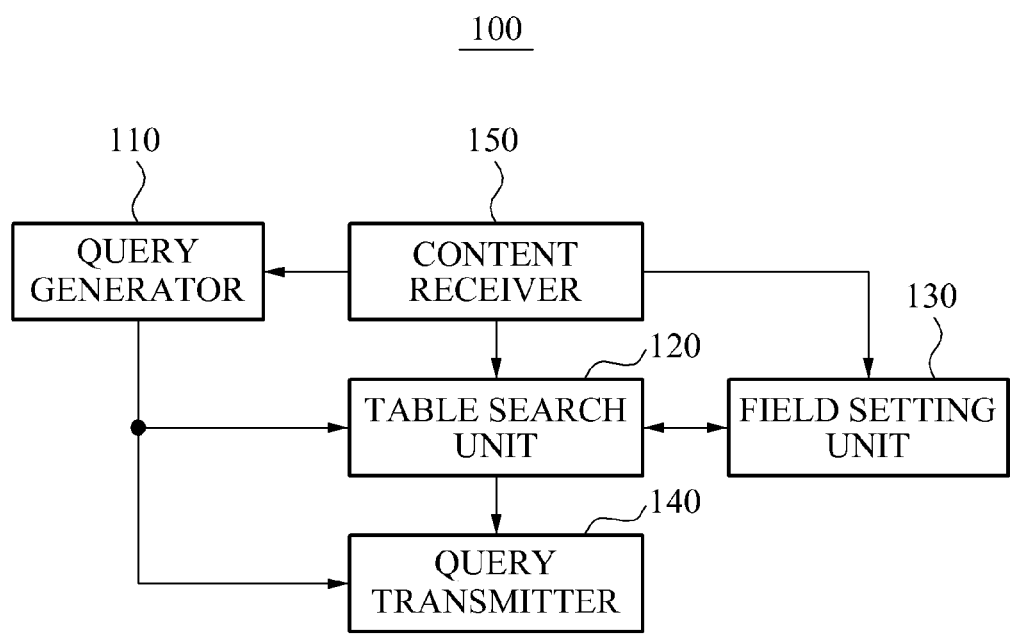
FIG. 2 is a diagram illustrating an example of a transmitting terminal device.

FIG. 2 illustrates an example of a transmitting terminal device.

Referring to FIG. 2, transmitting terminal device 100 includes a query generator 110, a table search unit 120, a field setting unit 130, a query transmitter 140, and a content receiver 150.

The query generator 110 may generate a query for requesting a plurality of segments that make up content. For example the query may request at least two segments from among the plurality of segments. The query generator 110 may generate a block query. The block query may include a block range of the content and a content name.

For example, to generate a request for content of "xyz.avi", the block query generated by the query generator 110 may be expressed as shown in Table 1.

TABLE 1

/abc.com/branch1/Comm_Lab/NWG/ xyz(Sn:Sm).avi

In the example of Table 1, the block range may include a start segment number Sn and a last segment number Sm.

Figure 3:
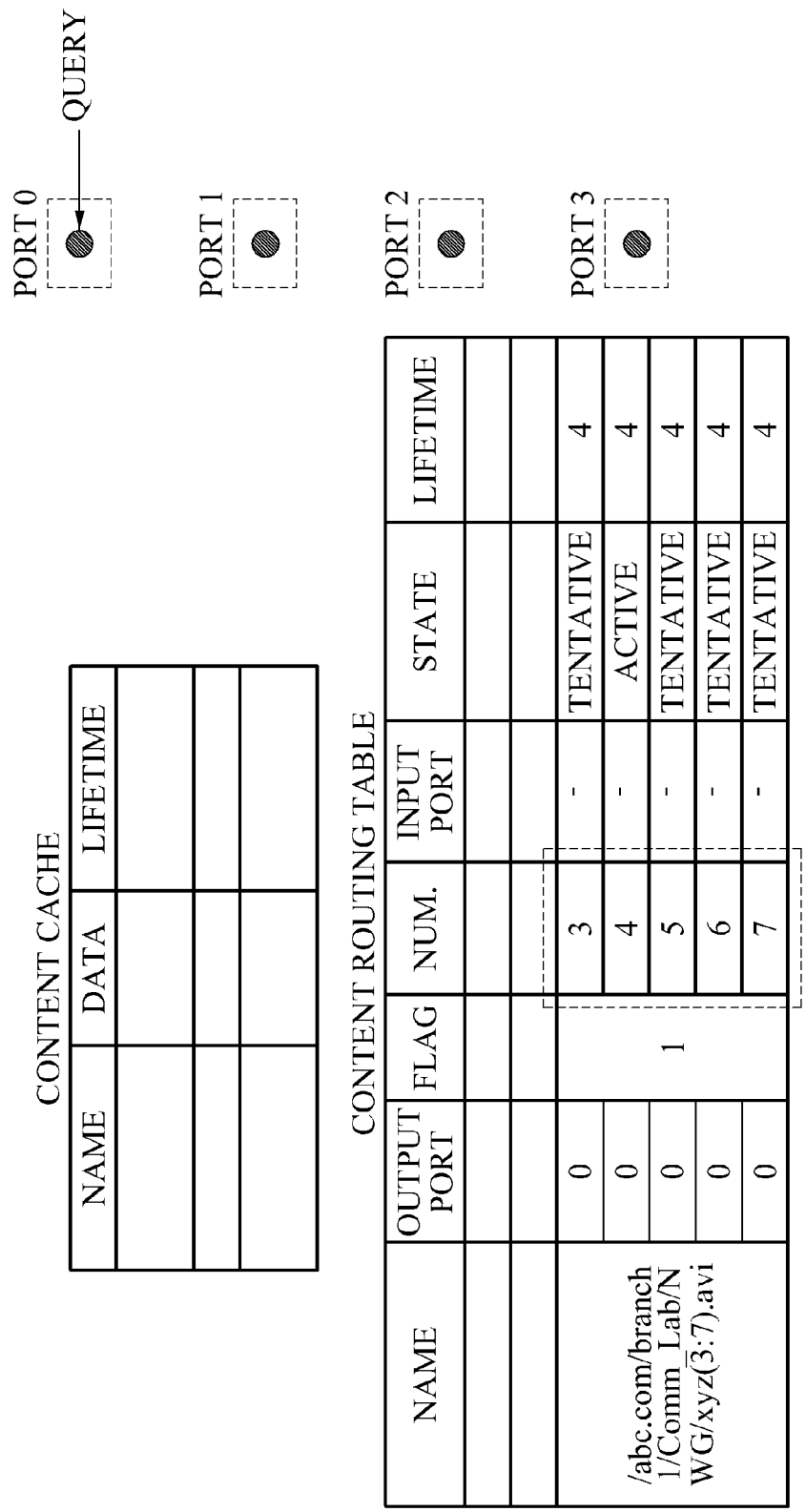
FIG. 3 is a diagram illustrating an example of a routing table based on content name.

For example, referring to FIG. 3, when the size of the block range is set to "5" and segments starting from segment 3 are requested, the query generator 110 may generate a block query requesting segments from the segment 3 to a segment 7, that is, the segments 3, 4, 5, 6, and 7. The segments 3, 4, 5, 6, and 7 that correspond to the block query may have the same transmission direction. The example in FIG. 3 illustrates an example of a routing table based on content name.

For example, a port may be used for the transmission direction. In this example, output ports of the segments 3, 4, 5, 6, and 7 corresponding to the block query may be the same, for example, the output port for each segment may be port "0" as shown in FIG. 3. In some embodiments, one or more segments may be output via one or more different ports and may be received via one or more different ports.

The query generator 110 may adjust the size of the block range based on whether the requested content is received. For example, the query generator 110 may adjust the size of the block range to increase by one. When the size of the block range is adjusted, the block range of segments requested may also be adjusted.

For example, when the block query requesting the segments 3, 4, 5, 6, and 7 is transmitted, and one of the segments 3, 4, 5, 6, and 7 is received within a corresponding lifetime, the query generator 110 may increase the size of the block range, for example, increase the block range from "5" to "6". Each time a segment is received within a corresponding lifetime, the query generator 110 may increase the size of the block range by one.

When a segment request is not received within a corresponding lifetime, and when the number of retransmissions meets or exceeds a reference value, the query generator 110 may readjust the size of the block range to default. For example, the query generator 110 may decrease the increased block range from "6" back to the default value of "5".

The table search unit 120 may search a routing table for the content name corresponding to the block query. For example, referring to the routing table of FIG. 3, the table search unit 120 may search a content name field NAME for "abc.com/branch1/Comm_Lab/NWG/xyz.avi". That is, the content matching scheme does not need to match or identify an identical match to the requested content name. Instead, for example, the content matching scheme may identify a content name that most closely matches the requested content name.

For example, the table search unit 120 may search the routing table for the name of a corresponding content using a longest matching scheme. For example, the table search unit 120 may search the content name field NAME for a content name that is most frequently matched with the content name corresponding to the block query.

As another example, the table search unit 120 may determine a transmission direction corresponding to the found content name.

As shown in FIG. 3, the table search unit 120 may determine port "0" as the output port for segments 3, 4, 5, 6, and 7 corresponding to the content name found from the routing table. The segments 3, 4, 5, 6, and 7 corresponding to the found content name may correspond to segments included in a block range of the block query generated by the query generator 110.

The field setting unit 130 may set a flag field, a number field, and a state field in response to the found content name.

For example, the field setting unit 130 may set the flag field to indicate whether segments corresponding to the found content name are included in the block query. When the segments are included in the block query, the field setting unit 130 may set the flag field to "1" as shown in FIG. 3.

The field setting unit 130 may set the number field to correspond to the found content name, based on the block range of the block query. For example, as shown in FIG. 3, the field setting unit 130 may set corresponding number fields to correspond to the segments 3, 4, 5, 6, and 7.

When the block query is transmitted from the query transmitter 140, the field setting unit 130 may set the state field corresponding to the found content name. For example, the field setting unit 140 may set the states of segments 3, 4, 5, 6, and 7 to "tentative."

As another example, when segments corresponding to the block query are received by the content receiver 150, the field setting unit 130 may set states of the received segments to "active". For example, the state "tentative" may indicate a state where a segment corresponding to the transmitted query is not received, and the state "active" may indicate a state where the segment corresponding to the transmitted query is received.

The query transmitter 140 may transmit the generated query using the determined transmission direction by searching the routing table. In the example shown in FIG. 3, the transmission direction is output port "0".

For example, when the block query is generated and the transmission direction is determined as the output port "0", the query transmitter 140 may transmit the block query using port "0". When a segment is not received within a corresponding lifetime, the query transmitter 140 may retransmit the query requesting the segment that was not received. For example, when the lifetime is elapsed, the query transmitter 140 may retransmit a query requesting segments of which states are still set to "tentative".

The query transmitter 140 may count or keep track of the number of retransmissions. For example, when a segment corresponding to the retransmitted query is not received within a corresponding lifetime, the query transmitter 140 may transmit the query requesting the segment that was not received a number of times until the counted number of retransmissions reaches a predetermined reference value.

When the segment corresponding to the retransmitted query is not received when the counted number of retransmissions reaches or exceeds the predetermined reference value, the table search unit 120 may delete a field corresponding to the not-received segment from the routing table.

For example, when the reference value is set to "3" and the lifetime is set to "4 seconds", and segments 3, 4, 6, and 7 are received and the segment 5 is not received during the lifetime of "4 seconds", the table search unit 120 may delete a transmission direction field, a number field, a state field, and a lifetime field corresponding to the segment 5 from the routing table.

In this example, the query generator 110 may adjust the size of the block range to the default value of "5", and may generate a block query including an indication that the segment 5 was not received.

For example, the query generator 110 may generate a block query requesting segments 5, 8, 9, 10, and 11. In another example, the query generator 110 may generate a query requesting only segment 5. In this example, the query transmitter 140 may transmit the generated block query or the query using the transmission direction corresponding to the block query or the query.

For example, the content receiver 150 may receive content using the same direction as the transmission direction of the block query. The table search unit 120 may set a state field of the received content by searching the routing table. In some embodiments, a plurality of segments corresponding to the block query may have different routing paths.

For example, when the block query including the segments 3, 4, 5, 6, and 7 is transmitted using port "0," the content receiver 150 may receive each of the segments 3, 4, 5, 6, and 7 using the port "0." Each of the segments 3, 4, 5, 6, and 7 may pass through a different router and may be received using the port "0" of the transmitting terminal device 100. In this example, the table search unit 120 may change the state field of each of the segments 3, 4, 5, 6, and 7 from "tentative" to "active" to thereby set the state field to "active".

When content is received via a plurality of network apparatuses, the content may be received by the transmitting terminal device 100 using ports used for transmitting a block query in a reverse order.

Figure 4:
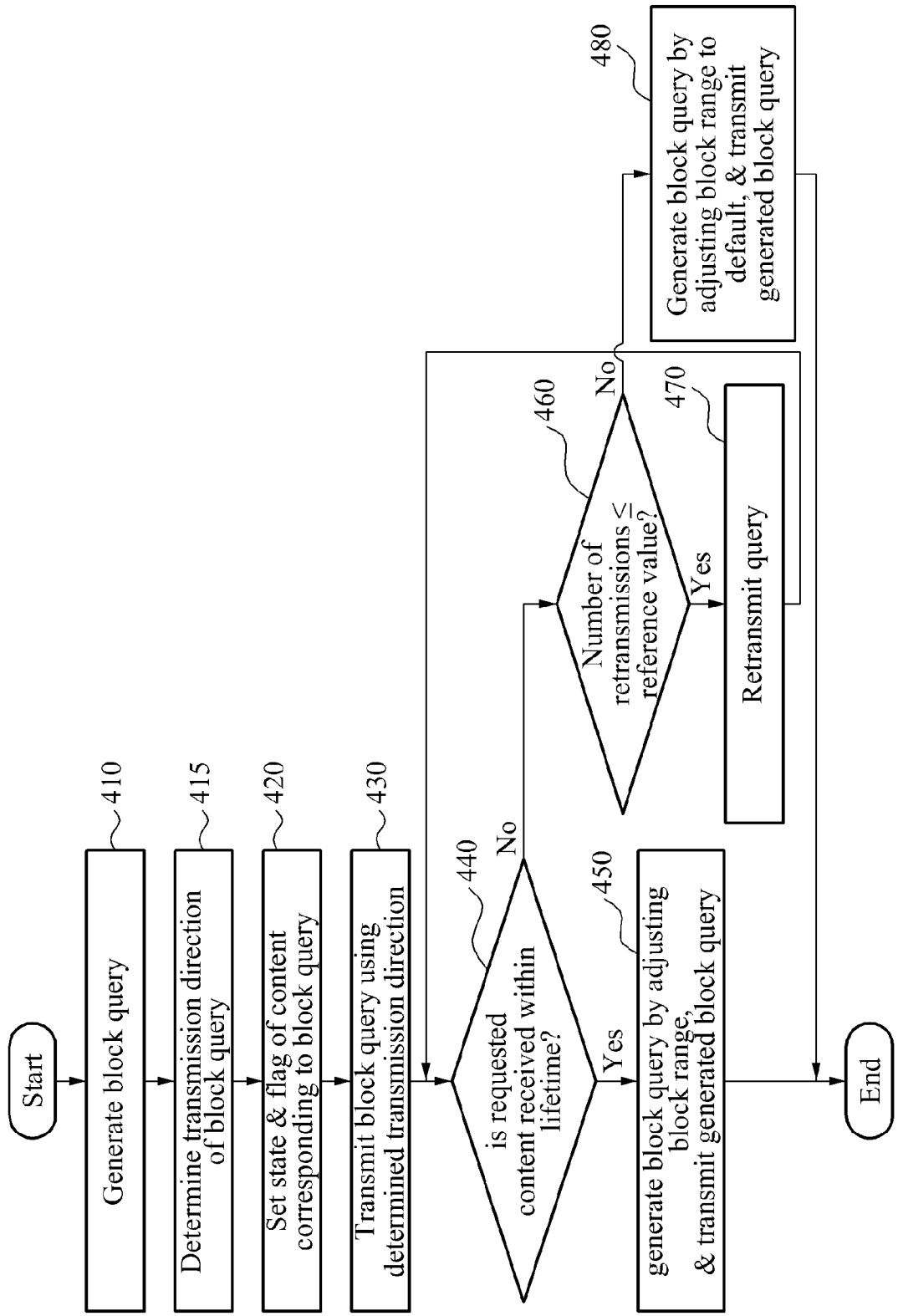
FIG. 4 is a flowchart illustrating an example of a method of a transmitting terminal device.

FIG. 4 illustrates an example of a method of a transmitting terminal device.

Referring to FIG. 4, in 410, a query generator generates a block query with respect to content including a plurality of segments. For example, the block query may include a block range and a content name. For example, when segments 3, 4, 5, 6, and 7 are requested, the block range of the block query may include a start segment number 3 and a last segment number 7. The query generator may generate a query requesting one or more segments using the block query.

In 415, a table search unit determines a transmission direction of the generated block query. For example, as shown in FIG. 3, the table search unit may search the routing table for the content name, and may determine an output port corresponding to the found content name. The found content name corresponds to segments requested using the block query.

In 420, a field setting unit sets a state field and a flag field of the content corresponding to the block query. For example, the field setting unit may set a state field of each of the segments corresponding to the block query to "tentative", and set the flag field thereof to "1".

In 430, a query transmitter transmits the generated block query using the determined transmission direction. For example, when the output ports of the segments 3, 4, 5, 6, and 7 are output port "0" based on a search result of the routing table, the query transmitter may transmit the block query using port "0." A content receiver may receive the segments 3, 4, 5, 6, and 7 corresponding to the block query using the port "0" via which the block query is transmitted. In this example, a plurality of segments, for example, the segments 3, 4, 5, 6, and 7 corresponding to the block query may have different routing paths.

When the requested content is received within a lifetime in 440, the query generator adjusts the size of the block range in 450 and transmits the adjusted block query. For example, when the segments 3, 4, 5, 6, and 7 corresponding to the block query are received within the lifetime, the query generator may adjust the size of the block range. For example, when the size of the block range is set to a default of "5", and when one of the requested segments is received, the query generator may adjust the size of the block range to increase the size from "5" to "6". When the size of the block range is adjusted, the block range of segments requested may also be adjusted.

Conversely, when the requested content is not received within the lifetime in 440, the terminal device may determine whether a retransmission request for the segment or segments that were not received has been transmitted. In 470, if the number of retransmission does not meet or exceed a reference value, the terminal device retransmits the query. For example, the query transmitter may count a number of retransmissions with respect to the retransmitted query. When the requested content is not received within the lifetime, the query transmitter may retransmit the query until the counted number of retransmissions meets or exceeds a predetermined threshold. For example, in 470 the query transmitter may retransmit a query requesting segments that have states which are set to "tentative".

When the number of retransmissions meets or exceeds the predetermined reference value in 460, in 480 the query generator may adjust or reduce the size of the block range. For example, the query generator 110 may generate a block query corresponding to the default number of segments based on the adjusted size of the block range.

The query transmitter may transmit the block query using the transmission direction corresponding to the generated block query. For example, the block query may include the adjusted block range and a content name including the segments corresponding to the adjusted block range.

Figure 5:
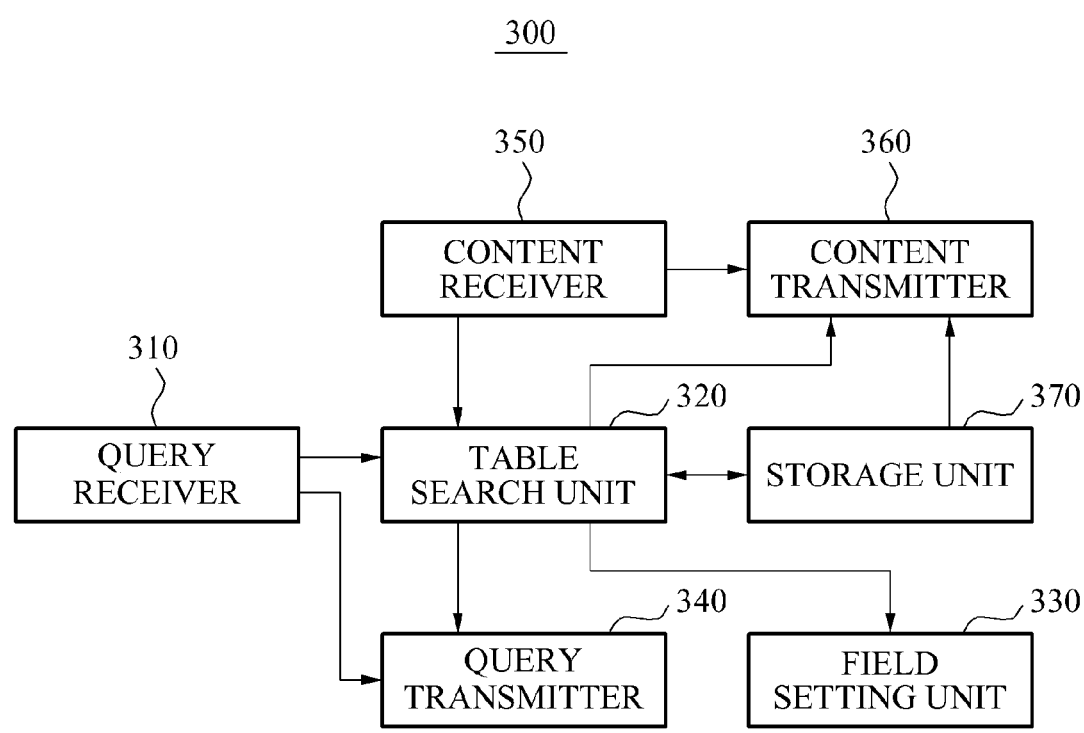
FIG. 5 is a diagram illustrating an example of a network apparatus based on content name.

FIG. 5 illustrates an example of a network apparatus based on content name.

Referring to FIG. 5, network apparatus 300 includes a query receiver 310, a table search unit 320, a field setting unit 330, a query transmitter 340, a content receiver 350, a content transmitter 360, and a storage unit 370. For example, the network apparatus 300 may correspond to the receiving terminal device 200 of FIG. 1. In the example of the receiving terminal device 200, the query transmitter 340 and the content receiver 350 of FIG. 5 may not be included in the network apparatus 300.

The table search unit 320, the field setting unit 330, the query transmitter 340, and the content receiver 350 may substantially function in the same way as described above with reference to FIG. 2 and thus, further description is omitted here.

The query receiver 310 may receive a query or a block query from a transmitting terminal device. For example, the block query may include a content name and a block range. The block range may include a start segment number and a last segment number. The block query may be used to request one or more segments included in the content.

For example, when a block query requests segments 3, 4, 5, 6, and 7 with respect to a content that includes 20 segments, the block range may include a start segment number 3 and a last segment number 7.

The table search unit 320 may verify whether the content corresponding to the block query is stored in the storage unit 370. In some embodiments, a cache may be used for the storage unit 370.

Figure 6:
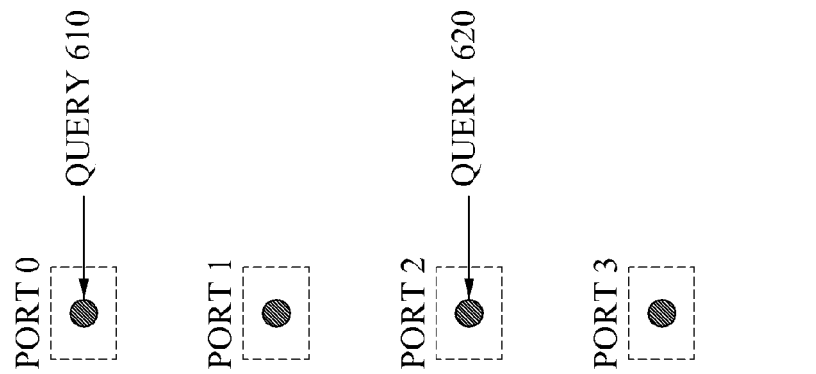
FIG. 6 is a diagram illustrating another example of a routing table based on content name.

When the content is stored, the table search unit 320 may search the routing table of FIG. 6 for the content name. FIG. 6 illustrates another example of a routing table based on content name.

The field setting unit 330 may set a state field, a flag field, and a reception direction field corresponding to the found content name. The reception direction field may indicate a direction via which the block query is received. For example, when the block query is received, the field setting unit 330 may set the flag field of each of segments corresponding to the block query, to "1." When setting the state field, the field setting unit 330 may set the state of each of the segments corresponding to the block query to "tentative" while the table search unit 320 verifies whether the content is stored in the storage unit 370.

When the content corresponding to the block query is transmitted via the content transmitter 360, the field setting unit 330 may change the state of each of the segments corresponding to the block query from "tentative" to "active", and thereby set the state field of each segment.

The content transmitter 360 may transmit the content corresponding to the block query using a corresponding reception direction, by referring to the reception direction field. For example, the direction through which the block query is received from the network apparatus 300 such as a router and the like, or from a transmitting terminal device, may be the same as to the transmission direction of the content.

For example, when the block query is received via port 2 620, the field setting unit 330 may set the reception direction field to "2", an input port field of each of the segments 3, 4, 5, 6, and 7 corresponding to the block query. In this example, the table search unit 320 may determine the port 2 620 as the transmission direction of the content, and the content transmitter 360 may transmit the segments 3, 4, 5, 6, and 7 via the port 2 620.

When the content is not stored, the table search unit 320 may search the routing table for the content name, and may determine a transmission direction corresponding to the found content name. For example, the table search unit 320 may search the routing table for the content name using a longest matching scheme.

As shown in the example illustrated in FIG. 6, the table search unit 320 may search the routing table, and may determine the transmission direction of each of the segments 3, 4, 5, 6, and 7 as "0". The query transmitter 340 may transmit the block query corresponding to the segments 3, 4, 5, 6, and 7 via a determined port 0 610.

When segments corresponding to the transmitted block query are not received within a corresponding lifetime, the table search unit 320 may delete, from the routing table, the fields corresponding to the segments that are not received. The segments corresponding to the block query may be received via the content receiver 350. As described in an example above, a transmitting terminal device may retransmit a query requesting the segments that were not received. In another example, the network apparatus 300 may delete the fields corresponding to the not-received segments from the routing table, without retransmission, thus decreasing a transmission burden of a network.

When the content is not stored, the field setting unit 330 may set a state field, a flag field, a number field, and a reception direction field of each of the segments 3, 4, 5, 6, and 7 corresponding to the block query.

For example, the field setting unit 330 may set the state field to "tentative", set the flag number to "1", set a corresponding segment number in each number field, and set the reception direction field or the input port field to be port 2.

Figure 7:
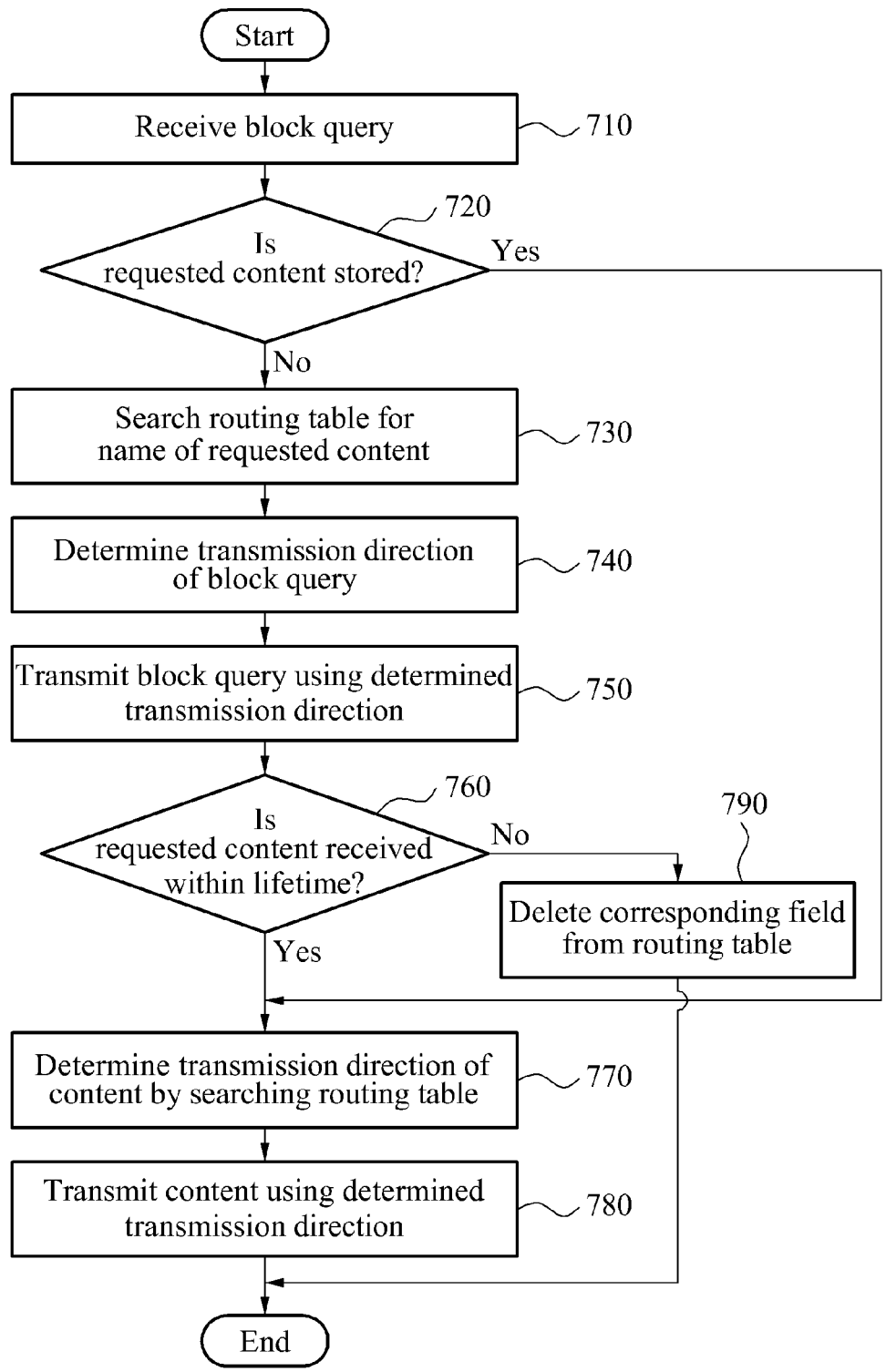
FIG. 7 is a flowchart illustrating an example of a method of a network apparatus that transmits/receives data based on content name.

FIG. 7 illustrates an example of a network apparatus that transmits/receives data based on content name.

Referring to FIG. 7, in 710, a query receiver receives a block query from a transmitting terminal device. The block query may include a content name and a block range. For example, the block query may be used to request one or more segments from among a plurality of segments included in the content.

A field setting unit may set a reception direction of the block query in a reception direction field of a routing table. For example, as shown in FIG. 6, when the block query is received via port 2, the field setting unit may set the reception direction field as "2".

In 720, a table search unit may verify whether the requested content is stored in a storage unit. For example, the table search unit may verify whether segments corresponding to the block query are stored in the storage unit. While the content is being searched in the storage unit, the field setting unit may set the state field of each of the segments corresponding to the block query to the state of "tentative".

When the content is not stored, the table search unit may search the routing table for the content name included in the block query, in 730. For example, the table search unit may search the routing table for the content name using a longest matching scheme.

In 740, the table search unit may determine a transmission direction of the block query in the routing table, based on the found content name. For example, as shown in FIG. 6, the table search unit may determine, as the transmission direction of the block query, port "0" corresponding to the found content name.

In 750, the query transmitter 340 may transmit the block query using the determined transmission direction.

When the requested content is received within a lifetime, in 760, the table search unit 320 may determine the transmission direction of the content by searching the routing table, in 770. For example, the transmission direction of the content may be the same as the reception direction of the block query received in 710. For example, the transmission direction of the content may be determined as port "2".

In 780, a content transmitter may transmit the content using the determined transmission direction of the content.

For example, when the block query is received from the transmitting terminal device, the content may be transmitted to the transmitting terminal device via port "2". When the block query is received from another network apparatus, the content may be transmitted, via port "2", to the other network apparatus that transmitted the block query in 710.

When the requested content is stored in 720, the table search unit may determine the transmission direction of the stored content in 770. The content transmitter may transmit the stored content using the determined transmission direction, in 780.

The field setting unit may change a state field corresponding to the transmitted content from "tentative" to "active" and thereby set the state field.

When the requested content is not received within the lifetime in 760, the table search unit may delete, from the routing table, fields corresponding to the content not received, in 790.

For example, when a segment 5 is not received within a corresponding lifetime, the table search unit may delete, from the routing table, fields corresponding to the segment 5.

Even though the block query is described to include the content name and the block range, the block query may further include a domain name as shown in Table 1.

As described above, segments corresponding to the block query may be received using a port via which the block query is transmitted. For example, a single physical port may be used, or the single port may include two logic interfaces. For example, the output or input port "0" may be configured as a single physical port, however, the output or input port "0" may include a logic interface to transmit the block query and a logic interface to receive a segment corresponding to the block query. Accordingly, even though the single port is employed, it is possible to logically classify a transmission of the block query from a reception of the segment. Also, in an example, even though each of port "1" through port "3" may be configured as a single physical port, each of the port "1" through the port "3" may include two logic interfaces.

As another example, one or more ports may be configured as two physical ports for dualization. For example, each of the port "0" through the port "3" may physically include a primary port and a secondary port. A query transmitter may transmit a block query using the primary port, and the content receiver may receive a segment corresponding to the block query using the primary port. When the primary port is found to be malfunctioning, the query transmitter may transmit the block query using the secondary port and the content receiver may receive the segment corresponding to the block query using the secondary port.

In a network system based on content name, for example, a Content Centric Network (CCN) or an Information Centric Network (ICN), requesting a single item of data or content by transmitting one interest is an operational principle. In an example, it is possible to transfer multiple data to a terminal device that requests content with one interest without violating the operational principle by using a block range of content. In this example, the data requesting terminal device may also be referred to as a content requestor or a data requestor.

In order to request multiple data with one interest, the content requestor may advertize a window size of data simultaneously accessible to a terminal device that provides data or content. In this example, the data providing terminal device may also be referred to as a content provider or a data sender.

In an example, to request multiple data or contents with one interest, a block range of segments requested by the content requestor are embedded in an interest packet header.

In response to an interest including a block range of content, the content requestor responds as if a plurality of interests having segments specified by a range field is received. For example, the range field may be included in a header of the interest, and the interest may be transferred in a form of a block query within a network.

In this example, when the content requestor transmits the interest including the block range, the content requestor registers a prefix specified by a name field of an interest concatenated with the segments specified by the block range. The content requestor registers the prefix to a forwarding information base (FIB) table. This is done in order to forward to the content requesting or other requesting terminal device data or a message corresponding to the interest when the data or the message corresponding to the interest is received.

A format of an interest including a block range of content, for example, a format of a block query, will be described with reference to FIG. 8.

Figure 8:
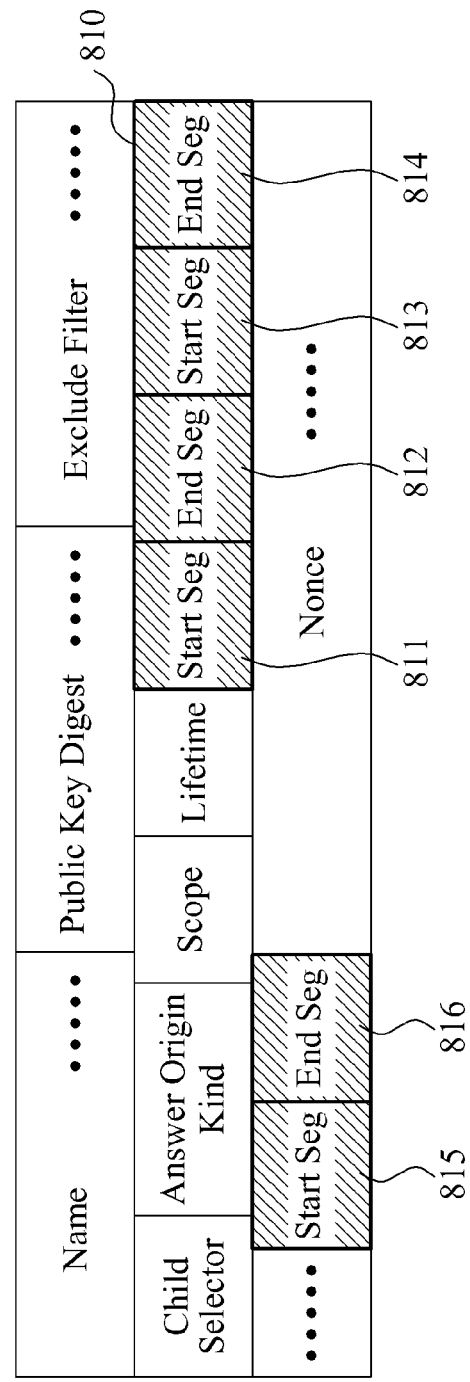
FIG. 8 is a diagram illustrating an example of a header format of a block query including a block range of content.

FIG. 8 illustrates an example of a header of a block query including a block range of content.

Referring to FIG. 8, the header includes a range field 810 for specifying the block range of content. In this example, the range field 810 includes start segment fields 811, 813, and 815, and end segment fields 812, 814, and 816. The start segment fields 811, 813, and 815, and the end segment fields 812, 814, and 816 may be consecutively present within the header.

The content requestor selectively requests multiple data due to packet losses or previously cached data. In this example, block ranges about the multiple data or messages may be specified in the header.

A number of segments specified by the range field 810 may be referred to as a window size, and a maximum number of segments that the range field 810 may specify may be referred to as a maximum window size. For example, if the range field 810 is specified as segment 1 through segment 10, the window size is 10.

In an example, to request multiple data or contents with one interest, it is possible to modify a processing process of a CCN Daemon (CCND). That is, a CCN forwarding engine using a range field. For example, the CCND may add, to an entry of a Pending Interest Table (PIT), segments within a block range that are absent in a content cache. Alternatively, the CCND may forward an interest including a block range of segments that are absent in the content cache and not transmitted before. An example of a method to process a block query including a block range of content using the modified processing method of the CCND will be described with reference to FIG. 9.

Figure 9:
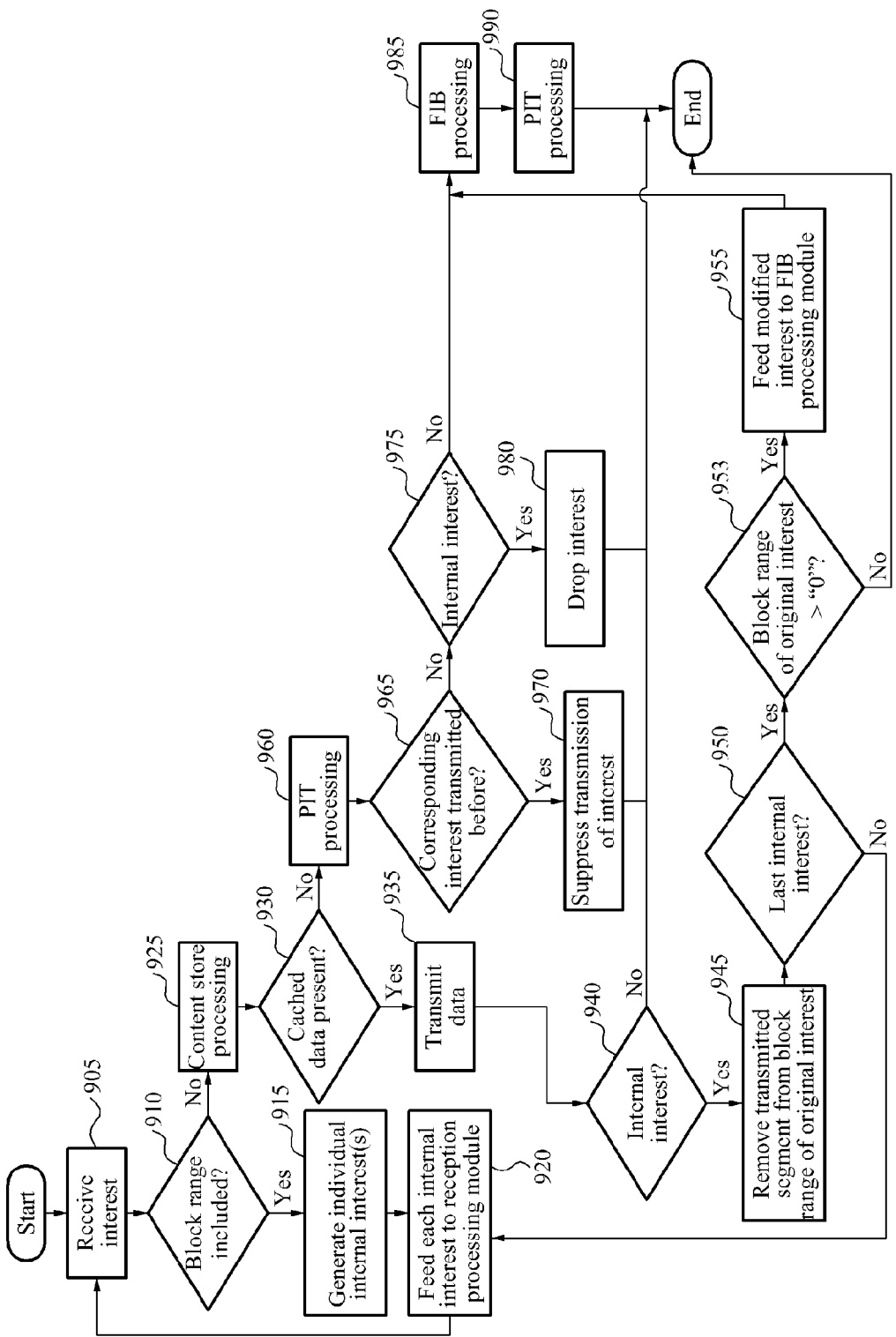
FIG. 9 is a flowchart illustrating an example of a method of a Content Centric Network Daemon (CCND) that processes a block query including a block range of content in a network apparatus based on content name.

FIG. 9 illustrates an example of a method of a CCND that processes a block query including a block range of content in a network apparatus based on content name.

In an example, the CCND may internally self-generate an interest according to a block range specification, and may process the interest as if the internally generated interest is received from outside. In this example, the internally generated interest may not be forwarded to a FIB table. Rather, the internally generated interest may be processed in a content store and a PIT in the same manner as a general interest. For example, if it is not an original interest or a modified original interest, the interest internally self-generated by the CCND may be processed only within a corresponding terminal device.

Referring to the example illustrated in FIG. 9, in 905, the CCND receives an interest from another terminal device included in a CCN using a port.

In 910, the CCND may determine whether the received interest includes a block range of content. For example, whether the received interest includes the block range of content may be determined based on whether a header of the received interest includes a range field.

When the received interest does not include the block range of content, the CCND performs content store processing with respect to the corresponding interest in 925.

Conversely, when the received interest includes the block range of content, the CCND generates an individual internal interest in 915. In 915, the CCND generates internal interests that respectively request segments corresponding to the block query based on the block range of content.

For example, when segments specified by the block range of content in the block query correspond to segment 1 through segment 5, the CCND generates five individual internal interests that request segment 1, segment 2, segment 3, segment 4, and segment 5, respectively. The individual internal interests may not include the block range.

In 920, the CCND feeds the generated internal interest to a reception processing module. Accordingly, the internal interest may return to operation 905 and experience the same processing steps as general interests. In this example, FIB processing is not performed with respect to the internal interest(s as will be described later.

In 910, the CCND determines whether the fed internal interest includes the block range. When the fed internal interest does not include the block range, the CCND performs content store processing with respect to the internal interest in 925.

In 930, the CCND determines whether data or content having the same name as the internal interest is cached in the content store. Data having the same name as the internal interest may be a segment having the same name as the internal interest.

When the cached data is present in the content store, the CCND transmits the cached data to a content requestor using an incoming port in 935. The incoming port may also be referred to as an incoming face.

In 940, the CCND verifies again whether an interest being processed by the CCND is an internal interest. When the corresponding interest is verified as the internal interest, the CCND modifies an original interest. In this example, the CCND modifies the original interest by removing the segment transmitted to the content requestor from the block range of the original interest in 945. Alternatively, when the corresponding interest is not the internal interest in 940, the CCND terminates the operation.

When the original interest is modified in 945, the CCND determines whether the corresponding interest is a last internal interest in 950. When the corresponding interest is the last internal interest, the CCND determines whether the block range of the original interest is greater than "0" in 953.

In an example, when the block range of the original interest is greater than "0", the CCND feeds the modified original interest including the block range to a FIB processing module in 955. In this example, the fed modified original interest is forwarded to the outside through FIB processing in 985 and PIT processing in 990.

Alternatively, when the block range of the original interest is less than or equal to "0" in 953, the CCND terminates the operation. Alternatively, when the corresponding interest is not the last internal interest, the CCND returns to operation 920 and feeds a subsequent internal interest to the reception processing module. When the cached data is absent in the content store in 930, the CCND performs PIT processing in 960.

In 965, the CCND determines whether the corresponding interest was transmitted before. For example, the CCND determines whether the corresponding interest was transmitted before based on whether the PIT includes an entry having the same name as the corresponding interest. When the PIT includes the entry having the same name as the corresponding interest, the CCND determines that the corresponding interest was transmitted before.

In an example, when the corresponding interest was transmitted before, the CCND suppresses transmission of the corresponding interest in 970 and then terminates the operation.

Alternatively, when the corresponding interest is not transmitted before, the CCND verifies whether the corresponding interest is an internal interest in 975. When the corresponding interest is verified as the internal interest, the CCND drops the corresponding interest without processing in 980 in order to prevent the internal interest from being forwarded to the outside.

Alternatively, when the corresponding interest is not the internal interest, the CCND performs FIB processing in 985. In the case of performing FIB processing in 985, the CCND determines whether the FIB includes an entry corresponding to a name of the corresponding interest. In this example, the CCND searches for an entry of the FIB using a longest prefix matching method based on the name of the interest.

In 990, the CCND performs PIT processing to register to the PIT information about the incoming port used to transfer the corresponding interest. Accordingly, when a data message including data or content corresponding to the interest is transferred, the data is transferred to a terminal device that requests the data using the incoming port.

The units, modules, elements, and methods described above may be implemented using one or more hardware components, or a combination of one or more hardware components and one or more software components. A hardware component may be, for example, a physical device that physically performs one or more operations, but is not limited thereto. Examples of hardware components include controllers, microphones, amplifiers, low-pass filters, high-pass filters, band-pass filters, analog-to-digital converters, digital-to-analog converters, and processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing to device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

Software or instructions for controlling a processing device, such as those described in FIGS. 2, 4, 5, 7, and 9, to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or to processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A terminal device, the terminal device comprising:
a processor comprising:
a query generator configured to generate, with respect to content comprising a plurality of segments, a block query comprising a content name and a block range of segments of the content, wherein segments indicated by the block range are to be routed based on the content name;
a table search unit configured to search, from a routing table, a content name which is matched with the content name, and to determine a transmission direction of the block query based on the found content name; and
a query transmitter configured to transmit the block query using the transmission direction corresponding to the found content name,
wherein the block range of segments corresponding to the block query have the same transmission direction.

2. The terminal device of claim 1, further comprising:
a field setting unit configured to set a flag corresponding to a found content name, and to set a block range of segment numbers corresponding to the generated block query in a number field,
wherein the field setting unit is further configured to set a state field of each of the block range of segments corresponding to the block query.

3. The terminal device of claim 1, wherein, when at least one of the block range of segments corresponding to the block query is received within a predetermined lifetime, the query generator is further configured to adjust the block range, and to generate the block query comprising the adjusted block range and the content name.

4. The terminal device of claim 1, further comprising:
a content receiver configured to receive the block range of segments corresponding to the block query using the same direction as the transmission direction of the block query.

5. The terminal device of claim 4, wherein the content receiver is further configured to receive the block range of segments corresponding to the block query, and one or more of the block range of segments have different routing paths.

6. A method for routing based on content name by a processor, the method comprising:
generating, with respect to content comprising a plurality of segments, a block query comprising a content name and a block range of segments of the content, wherein segments indicated by the block range are to be routed based on the content name;
searching, from a routing table, a content name which is matched with the content name;
determining a transmission direction of the block query based on the found content name; and
transmitting the block query using the transmission direction corresponding to the found content name,
wherein the block range of segments corresponding to the block query have the same transmission direction.

7. The method of claim 6, further comprising:
setting a flag corresponding to a found content name, and setting a block range of segment numbers corresponding to the generated block query in a number field; and
setting a state field of each of the block range of segments corresponding to the block query.

8. The method of claim 6, wherein the generating comprises:
adjusting the block range when at least one of the block range of segments corresponding to the block query is received within a predetermined lifetime; and
generating the block query comprising the adjusted block range and the content name.

9. The method of claim 6, further comprising:
receiving the block range of segments corresponding to the block query using the same direction as the transmission direction of the block query.

10. The method of claim 9, wherein one or more of the received block range of segments corresponding to the block query have different routing paths.

11. A terminal device, the terminal device comprising:
a processor comprising:
a query receiver configured to receive an interest packet;
a network demon configured to
determine whether the interest packet is a block query containing a requests for at least two segments from among segments of content, wherein the block comprises a content name of the content and a block range indicating the at least two segments;
if the interest packet is determined to be a block query, generate internal interest packets corresponding to the at least two segments. and forward the generated internal interest packets to the query receiver; and a table search unit to search, from a routing table, a content name which is matched with the content name.

12. The terminal device of claim 11, further comprising:
a query transmitter configured to transmit the block query using a transmission direction corresponding to the found content name based on whether the requested content is stored.

13. The terminal device of claim 11, further comprising:
a field setting unit to set a flag corresponding to a found content name,
wherein the field setting unit is further configured to set a state field of the requested content in the routing table, and to set a reception direction of the block query with respect to the at least two segments corresponding to the block query.

14. The terminal device of claim 13, further comprising:
a content transmitter to transmit each of the at least two segments corresponding to the block query using the set reception direction.

15. The terminal device of claim 13, further comprising:
a content receiver to receive at least one segment of the at least two segments corresponding to the block query using a transmission direction of the block query when the requested content is not stored.

16. A method for routing based on content name by a processor, the method comprising:
receiving an interest packet;
determining whether the interest packet is a block query containing a request for at least two segments from among segments of content, wherein the block query comprises a content name of the content and a block range indicating the at least two segments;
if the interest packet is determined to be a block query,
generating internal interest packets corresponding to the at least two segments; and
forwarding the generated internal interest packets to the receiving step; and
searching, from a routing table, a content name which is matched with the content name.

17. The method of claim 16, further comprising:
transmitting the block query using a transmission direction corresponding to the found content name based on whether the requested content is stored.

18. The method of claim 16, further comprising:
setting a flag corresponding to a found content name;
setting a state field of the requested content in the routing table; and
setting a reception direction of the block query with respect to the at least two segments corresponding to the block query.

19. The method of claim 18, further comprising:
transmitting each of the at least two segments corresponding to the block query using the set reception direction.

20. The method of clam 18, further comprising:
receiving at least one segment of the at least two segments corresponding to the block query using a transmission direction of the block query when the requested content is not stored.

21. A network apparatus using a routing table, the network apparatus comprising:
a processor; and
a memory storing the routing table, wherein the routing table comprises:
a content name field used to search for content comprising a plurality of segments;
a transmission direction field used to transmit a query for requesting the content;
a reception direction field to indicate a reception direction of the query;
a flag field to indicate whether the query corresponds to a block query requesting at least two segments of the plurality of segments; and
a number field to indicate a number of a segment corresponding to the requested query.

22. The network apparatus of claim 21, wherein the routing table further comprises:
a state field to indicate whether the content corresponding to the transmitted query has been received; and
a time field to indicate a reception lifetime of the content.

23. The network apparatus of claim 21, wherein:
the query is transmitted using a transmission direction set in the transmission direction field, and the content corresponding to the query is received using a transmission direction of the query, and
the reception direction field comprises the reception direction of the query, and the content corresponding to the query is transmitted using the reception direction of the query.

24. The network apparatus of claim 21, wherein:
the block query comprises a content name and a block range, and
the block range comprises a start segment and a last segment of the at least two segments corresponding to the block query.

25. The terminal device of claim 1, wherein the table search unit is configured to search a content name field for the content name that is longest-matched with the content name of the generated block query.

26. The terminal device of claim 2, wherein the field setting unit is configured to set the flag indicating that the block range of segments corresponding to the found content name are included in the block query.

\* \* \* \* \*